Patented Aug. 26, 1952

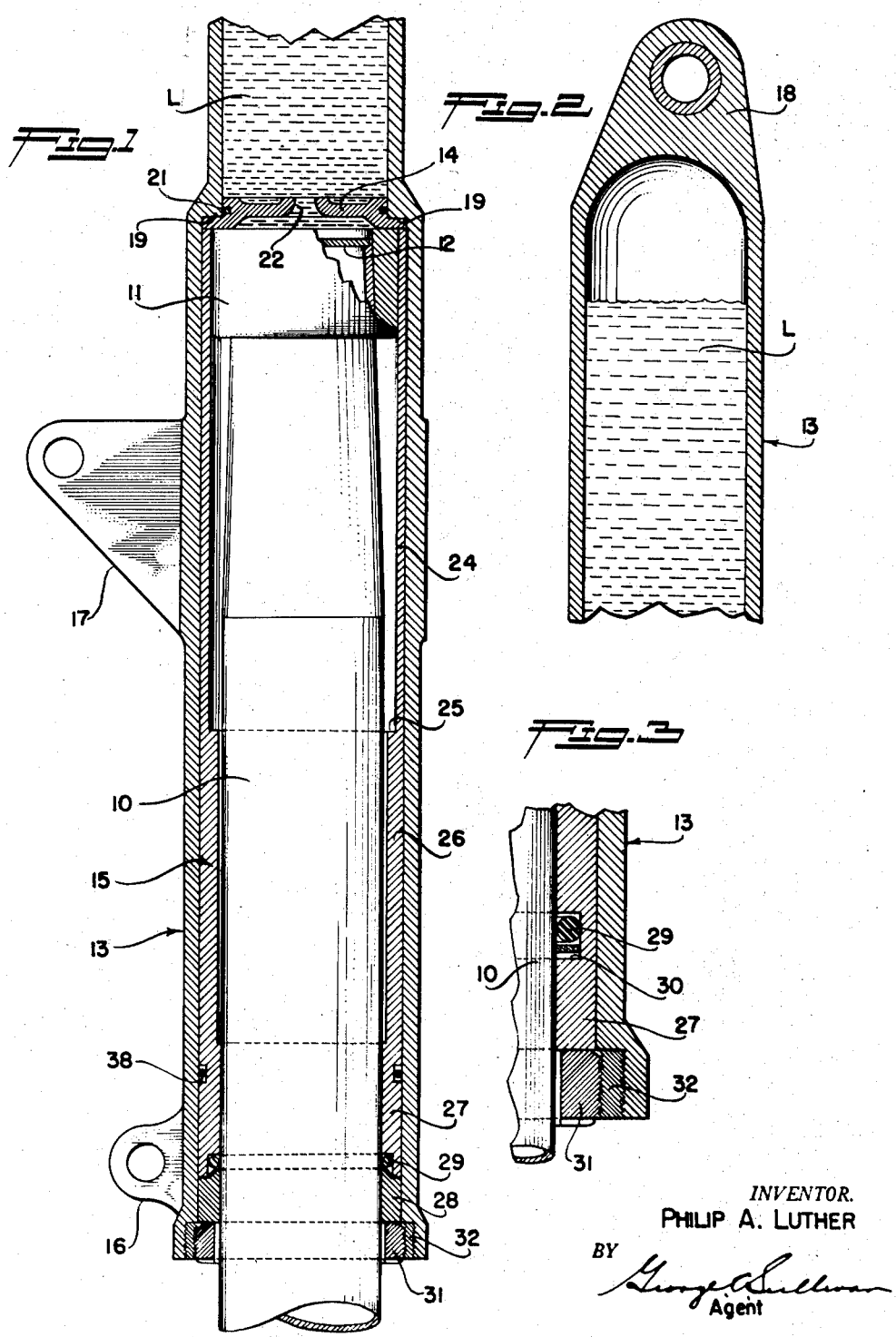

2,608,403

UNITED STATES PATENT OFFICE 2,608,403

SHOCK ABSORBING STRUT FOR AIRCRAFT

Philip A. Luther, Sepulveda, Calif., assignor to Lockheed Aircraft Corporation, Burbank, Calif.

Application March 15, 1950, Serial No. 149,762

9 Claims. (Cl. 267—64)

This invention relates to aircraft landing gear and relates more particularly to shock absorbing cylinders for incorporation in such landing gear. It is an object of the invention to provide a practical, light weight, inexpensive cylinder construction for an aircraft landing gear strut.

It is desirable and important to reduce the weight of aircraft landing gear and while the shock strut cylinders of such apparatus have, so far as I am aware, always been constructed of steel, the cylinders might well be constructed of aluminum, aluminum alloy or similar light weight material if the problems of poor resistance to wear, internal thread galling, etc. of such material are satisfactorily solved. In addition to the reduction in weight that may be obtained by the use of an aluminum alloy or the like in the construction of the cylinders, the cost of manufacture will also be materially reduced. The aluminum or aluminum alloy is much easier to machine and finish than the heat treated steel customarily used in constructing the cylinders for the shock struts.

It is another object of the invention to provide a shock strut cylinder construction characterized by a replaceable liner which eliminates cylinder wear due to piston motion and which does not require the employment of internal threads in the cylinder. The provision of the unique liner which assumes the wear incident to travel of the piston makes it not only feasible, but also practical to construct the cylinder of aluminum, aluminum alloy or the like, thereby reducing both the cost of manufacture and the overall weight of the cylinder.

Another object of the invention is to provide a landing gear shock cylinder of the character referred to wherein the liner serves to provide a seat or support for the orifice plate, thereby avoiding the necessity for employing threads or other securing means for the plate. An end of the replaceable liner engages the orifice plate to hold the plate against a shoulder or the equivalent on the cylinder wall so that the plate is securely and positively retained in place without the provision of attachment threads or the like.

A further object of the invention is to provide a shock cylinder construction of the character mentioned wherein the replaceable liner is a multi-purpose element operating as a bearing gland, a side wear assuming part, an orifice plate seat and as a stop for the head of the piston. The use of the replaceable liner which is preferably constructed of a long wearing, non-metallic material, to avoid electrolytic difficulties, greatly simplifies the manufacture of the cylinder, and therefore, reduces its cost.

Other objectives and features of the invention will become apparent from the following detailed description of typical preferred embodiments throughout which description reference is made to the accompanying drawings wherein:

Figure 1 is a longitudinal detailed sectional view of the major portion of the cylinder and piston assembly of a shock strut embodying the invention with the piston tube appearing in side elevation;

Figure 2 is a longitudinal sectional view of the upper portion of the cylinder; and Figure 3 is an enlarged fragmentary longitudinal sectional view illustrating another form of liner construction of the invention.

The construction of the invention may be modified to adapt it for use or incorporation in shock strut cylinders of different proportions and design. Accordingly, the invention is not to be construed as limited or restricted to the specific application illustrated in the accompanying drawings. As illustrated, the shock strut assembly includes a piston tube 10 provided at its upper end with a sleeve or head 11. The piston head 11 is, of course, fixed to the tube 10, and a partition or bulkhead 12 closes the upper end of the tube. The present invention is not primarily concerned with the details of the piston tube assembly which may be of any selected or required construction. The cylinder assembly of the invention includes the cylinder proper 13, and orifice plate 14 in the cylinder, and a replaceable wear taking liner 15, secured in the cylinder 13 and holding the plate 14 in place.

In accordance with the invention, the cylinder 13 is preferably constructed of aluminum, an aluminum alloy or other light weight material. When constructed of an aluminum alloy, for example, the cylinder 13 is easy and inexpensive to machine. Spaced lugs, 16 and 17, project from a side of cylinder 13 and the upper end of the cylinder has a lug 18. These lugs 16, 17 and 18 and any other lugs that may be necessary are integral with the cylinder and are bored or provided with openings to facilitate their connection with other elements of the landing gear not shown. Heretofore, it has been the general practice to heat treat the steel of which the shock strut cylinder is to be constructed and then finish machine the cylinder as by turning and by contour milling the areas provided with the integral lugs 16, 17 and 18. Where the cylinder 13 of the invention is constructed of an aluminum alloy or the like, these machining operations are much less costly and time consuming. The cylinder 13 is open at its lower end to receive the piston tube 10 while the upper end of the cylinder is closed to form a closed chamber for containing the air and liquid L of the shock or motion dampening strut. The upper portion of the cylinder 13 has an annular, downwardly facing seat or shoulder 19 for the orifice plate 14. The portion of the cylinder 13 below the shoulder 19 receives or contains the liner 15 and in accordance with the invention, this part of the cylinder may be of uniform internal diameter except at its extreme lower end, thereby further simplifying the manufacture and reducing costs. It will be observed that the cylinder 13 is a simple, inexpensive, easily machined part. The wall thickness of the cylinder 13 may, of course, be somewhat greater than that of a steel cylinder to adequately withstand the loads to which it will be subjected in service.

The orifice plate 14 serves to control, limit or meter the flow of fluid to and from the upper portion of the cylinder 13 during relative longitudinal movement between the piston 11 and the cylinder. The plate 14 is arranged in the cylinder to bear or seat upwardly against the shoulder 19 and preferably has a seal ring 21 for sealing with the internal surface of the cylinder 13 above the shoulder. A central fluid port or orifice 22 of selected limited capacity is provided in the plate 14 to permit the metered or controlled flow of fluid during relative movement of the cylinder and piston 11. In practice or if desired, the piston assembly may carry a metering pin for cooperating with the orifice 22 to further control the flow of fluid, this being common practice in the art.

The replaceable liner 15 which is a feature of the invention is a tubular element removably arranged and secured in the cylinder 13. The liner 15 is the wear assuming member of the cylinder assembly and is preferably constructed of a material having a low coefficient of friction and that is long wearing. A preferred material such as Micarta, which is a phenolic resin reinforced by laminations of impregnated fabric or the like. Micarta is available in laminated form, that is, with sheets of fabric or paper impregnated with the resin and bonded under heat and pressure, and in molded form composed of chopped sheets of impregnated fabric or paper bonded under heat and pressure and molded to shape. Either of these forms of Micarta is suitable for the manufacture of liner 15. In practice the liner 15 may be machined from a laminated Micarta tube initially of sufficient wall thickness to permit the required internal machining. This material is easily machined and presents smooth low friction surfaces when machined by conventional techniques. Furthermore, the laminated Micarta is a low density or light weight material, thereby further reducing the weight of the cylinder assembly. As an alternative or if desired, the liner 15 may be constructed of metallic bearing material, such as a cast aluminum bronze alloy or a wrought aluminum bronze alloy. An example of a suitable cast aluminum bronze alloy contains approximately 78 percent copper, from 10.5 to 12 percent aluminum, from 2 to 5 percent iron, approximately 5 percent manganese, approximately 5 percent nickel and approximately 0.2 percent tin. A suitable aluminum bronze alloy to be used in the wrought condition may contain from 78 to 93 percent copper from 6.5 to 11 percent aluminum, approximately 4 percent iron, approximately 5.5 percent nickel, approximately 2.25 percent silicon, approximately 2 percent manganese and a small amount of tin. Bearing alloys of the types just described have been found to be practical as bearings in landing gear shock struts and are well adapted for the replaceable liner 15 if a metallic liner is desired.

The liner 15 extends from the orifice plate 14 to adjacent the lower end of the cylinder 13 and if preferred may be a continuous one-piece tubular element as illustrated. The external diameter of liner 15 is uniform or constant and the liner engages or fits in the major uniform bore of the cylinder 13. The upper end of the liner 15 is flat and normal to cooperate with the lower surface of the orifice plate 14 and thereby holds the plate against the shoulder 19. It will be observed that this arrangement assures the positive retention of the plate 14 without the necessity for providing threads on the cylinder 13 or employing other securing means for the plate. The major upper portion 24 of the liner 15 constitutes the area or zone in which the piston head 11 operates and the piston head slideably engages in this part of the liner. The wall thickness of this portion 24 of the liner 15 is less than that of the balance of the liner and an upwardly facing annular shoulder 25 is formed at the plane where the portion 24 joins the intermediate portion 26 of the liner. The shoulder 25 is engageable by the underside of the piston head 11 to limit the relative downward travel of the piston assembly, the shoulder constituting a stop for the piston.

The above mentioned liner portion 26 receives the piston tube 10 with clearance as illustrated in Figure 1 and extends downwardly from the stop shoulder 25 to join what I will term a bearing portion 27. This bearing portion 27 of the liner 15 is of reduced internal diameter to have a sliding fit or bearing engagement with the piston tube 10. An external annular groove is preferably formed in the bearing portion 27 to receive a seal ring 33 for sealing with the internal surface of the cylinder 13. It is to be observed that with the liner 15 of the invention, the "bearing overlap" varies as the shock strut operates thereby reducing the bearing pressures. When the shock strut is fully extended with the piston head 11 at the stop shoulder 25, the distance between the piston head 11 and the bearing portion 27 of the liner 15 is at a minimum, that is, the bearing overlap is at a minimum. However, when the shock strut is telescoped under full compression and load with the piston head 11 adjacent the orifice plate 14 as illustrated in Figure 1, the bearing overlap is at a maximum so that the bearing pressures at the piston head 11 and the bearing portion 27 are reduced or lessened to the greatest degree possible.

In the embodiment of the invention illustrated in Figure 1, a tubular gland 28 is provided in the cylinder 13 to engage the lower end of the liner 15, and a sealing ring assembly 29 is arranged between the ends of the gland and the liner to seal with the piston tube 10. This sealing ring assembly 29 may include an O ring of rubber or synthetic rubber and a backup ring of leather or the like. In the embodiment of my invention illustrated in Figure 3, there is no separate gland 28 and the sealing ring assembly ring 29 is arranged in an annular groove 30 in the internal surface of the bearing portion 27. The means for removably retaining the liner 15 in the cylinder 13 includes a permanent steel insert 32 secured in the lower end of the cylinder 13. The insert 32 is preferably plated, for example, it may be cadmium plated and is permanently threaded in the lower portion of the cylinder. Wet zinc chromate primer is preferably provided on the external threads of the insert 32 to prevent corrosion due to electrolytic action. A tubular gland nut 31 is in turn threaded in the insert 32 to engage or clamp upwardly against the lower end of the gland 28 or liner 15 as the case may be to secure the liner in the cylinder 13 and thereby retain the orifice plate 14 at the shoulder 19. The internal thread diameter of the insert 32 is greater than the external diameter of the gland 28 and liner 15 so that the latter elements may be readily installed and removed.

It is believed that the features and operation of the invention will be readily apparent from the foregoing detailed description. The replaceable wear taking one-piece liner 15 provides the piston head receiving and wear assuming portion 24, presents a seat or support for the orifice plate 14, provides the stop shoulder 25 for the piston head 11 and provides the bearing portion 27 for the piston tube 10. Thus the liner 15 relieves the cylinder 13 of all wear incident to piston travel making it practical to construct the cylinder of aluminum, aluminum alloy or the like. The liner and cylinder assembly is such that no internal threading of the cylinder is required at the orifice plate 14 and the cylinder may be of simple design. These factors contribute to a low cost, light weight shock strut cylinder. While the liner 15 is long wearing, it may be readily replaced when necessary.

Having described only typical forms of the invention I do not wish to be limited to the specific details herein set forth, but wish to reserve to myself any variations or modifications that may appear to those skilled in the art and fall within the scope of the following claims.

I claim:

1. In a shock strut, a shock strut cylinder of light weight metal, a piston operable in the cylinder, an orifice plate arranged in the cylinder to control fluid flow during piston movement, and a wear assuming liner in the cylinder slidably receiving the piston and engaging the plate to retain the same in the cylinder.

2. In a shock strut, a cylinder having an internal shoulder, a piston operable in the cylinder, an orifice plate arranged against the shoulder to control fluid flow in the cylinder during piston movement, and a wear assuming liner for the cylinder slidably receiving the piston and holding the plate against the shoulder to retain the plate in the cylinder.

3. In a shock strut, a cylinder having an internal shoulder, a piston element operable in the cylinder and having a head, an orifice plate in the cylinder arranged against said shoulder to control fluid flow in the cylinder during piston element movement, and a wear assuming liner in the cylinder holding the plate against said shoulder and having internal surfaces slidably receiving said element and said head.

4. In a shock strut, a cylinder having an internal shoulder, a piston element operable in the cylinder and having a head, an orifice plate in the cylinder arranged against said shoulder to control fluid flow in the cylinder during piston element movement, and a wear assuming liner in the cylinder holding the plate against said shoulder and having internal surfaces slidably receiving said element and said head, said liner having an internal shoulder engageable by said head to limit movement of the piston element.

5. An aircraft shock strut including a light weight cylinder constructed of a light weight metal, a piston element extending into the cylinder comprising a piston tube and head of enlarged diameter on the tube, and a wear assuming liner in the cylinder of non-metallic material having a portion slidably receiving the piston tube and a portion slidably receiving the head.

6. An aircraft shock strut including a light weight cylinder constructed of an aluminum alloy, a piston element extending into the cylinder comprising a piston tube and a head of enlarged diameter on the tube, and a wear assuming liner of a synthetic resin plastic in the cylinder having a portion slidably receiving the piston tube and a portion slidably receiving the head, the liner having an internal shoulder at an end of the last named portion engageable by the head to limit travel of the piston element.

7. A shock strut including a light weight cylinder of aluminum alloy, a piston element extending into the cylinder comprising a stem and a head on the stem, a non-metallic wear assuming liner in the cylinder having a portion slidably receiving the piston head and having a bearing portion slidably receiving the stem, and means at an end of the cylinder removably retaining the liner in the cylinder.

8. A shock strut including a light weight cylinder of aluminum alloy having an internal shoulder, a piston operable in the cylinder including a stem and a head on the stem, an orifice plate seated on the shoulder for controlling fluid flow during piston movement, a wear assuming liner of phenolic resin in the cylinder having one end cooperating with said plate to hold the plate at said shoulder, the liner including a portion slidably receiving the head, a bearing portion slidably receiving the piston stem and a shoulder engageable by the head to limit piston movement, and means cooperating with the other end of the liner for removably retaining the liner in the cylinder.

9. A shock strut including a light weight cylinder of alluminum alloy having an internal shoulder, a piston operable in the cylinder including a stem and a head on the stem, an orifice plate seated on the shoulder for controlling fluid flow during piston movement, a wear assuming liner of phenolic resin containing fibrous material in the cylinder having one end cooperating with said plate to hold the plate at said shoulder, the liner including a portion slidably receiving the head, a bearing portion slidably receiving the piston stem and a shoulder engageable by the head to limit piston movement, and means cooperating with the other end of the liner for removably retaining the liner in the cylinder.

PHILIP A. LUTHER.

REFERENCES CITED

The following references are of record in the file of this patent:

UNITED STATES PATENTS

| Number | Name | Date |
|---|---|---|
| 2,196,068 | Greve | Apr. 2, 1940 |
| 2,363,485 | Down | Nov. 28, 1944 |

FOREIGN PATENTS

| Number | Country | Date |
|---|---|---|
| 545,877 | Great Britain | June 17, 1942 |